United States Patent [19]
McLain et al.

[11] Patent Number: 5,361,929
[45] Date of Patent: Nov. 8, 1994

[54] FLUID TANK WITH SADDLE RACK TOP

[76] Inventors: Mike D. McLain; Robert W. McLain, both of P.O. Box 1370, Camp Verde, Ariz. 86322

[21] Appl. No.: 65,885

[22] Filed: May 21, 1993

[51] Int. Cl.5 ............................ B65D 6/00; B60P 3/04
[52] U.S. Cl. .................... 220/562; 296/24.2; 220/4.12; 220/890
[58] Field of Search ............... 220/562, 4.12, 890; 296/24.2

[56] References Cited

U.S. PATENT DOCUMENTS

| | | | |
|---|---|---|---|
| 172,609 | 1/1876 | Clark | 220/562 |
| 760,588 | 5/1904 | Ulrich | 220/562 |
| 1,452,789 | 4/1923 | Carek | 220/562 |
| 2,166,134 | 7/1939 | Fitch | 220/562 |
| 4,830,538 | 7/1985 | Greene, Jr. et al. | 296/242 |

Primary Examiner—Joseph Man-Fu Moy
Attorney, Agent, or Firm—Gregory J. Nelson

[57] ABSTRACT

A combination fluid tank and saddle rack may be mounted to a flat surface or the bed of a horse trailer. The device is ideally of one-piece polymer construction, with fluid input and output ports. The top of the device is generally shaped to conform to the undercurve of a saddle to provide for secure saddle storage during transportation. An alternative embodiment of the device provides for a saddle rack top, formed as a separate piece from the fluid tank and slidably mounted to the tank through a keyed slide and key-way slot mechanism. This embodiment allows for easy loading and unloading of a saddle to and from the rack when the device is mounted wholly within the tack compartment of a horse trailer. Alternatively, the slidable saddle rack may comprise a pair of such racks each independently slidable with respect to the other.

14 Claims, 2 Drawing Sheets

FLUID TANK WITH SADDLE RACK TOP

BACKGROUND

1. Technical Field of the Invention

This invention relates to the field of devices used for the maintenance, care, and transportation of horses and tack. Specifically, this invention relates to devices used for the containment and transportation of drinking fluids and storage of saddles. Drinking fluids, saddles, and other equipment and supplies must be taken along when the owner of a horse transports the animal away from its home, for example to riding grounds or rural areas, for extended periods of time. The technical field that encompasses this invention comprises devices that allow those persons who engage in the transportation and use of horses and tack to conveniently provide the animals with drinking fluids when away from home and to provide for saddle storage during transportation.

2. Prior Background Art

The prior art is comprised of devices widely known and used, and which offer little in the way of convenience for those who transport horses. Typically, fluid containers varying from gallon jugs to 50 gallon barrels must be filled and loaded onto horse trailers to insure that horses have an adequate supply of liquid refreshment. This is due to the absence of available drinking fluids on the road and in rural areas. Even if a natural water source exists at a riding site, a horse owner cannot be sure of the water's purity. Additionally, saddles are loaded into a tack compartment or are transported in the bed of a trailer. These traditional means of transportation expose relatively expensive saddles to a high risk of damage in transport.

Thus, there exists a need for a device that can be used for the transportation of safe, pure, drinking fluids for horses. The need also exists for a saddle rack to provide storage and protection of saddles during transportation. The present invention is safe, convenient, relatively light weight, and easily used by persons who transport horses and tack. If desired, the device may be permanently attached to any horse trailer. It is easy to fill with drinking fluid, which may then be easily dispensed from the device into a pail or other container for direct provision to a horse. Additionally, the top of the device provides convenient and safe place for saddle storage.

SUMMARY DESCRIPTION OF THE INVENTION

The invention is disclosed as the combination which comprises a liquid storage and transport tank; and a saddle rack top on the tank. The saddle rack top has a general curvature approximating the undercurve of a saddle. The tank and rack top are transportable on a conveyance for transport of livestock.

Typically the general curvature comprises at least four generally planar surfaces angularly offset, one with respect to the other, in approximation of the general curvature of the underside of a saddle. Preferably, the liquid storage and transport tank is a one piece, polymer construction.

In a presently preferred embodiment, the saddle rack top is slidably coupled to the tank. To this end the saddle rack top has a key-way slot therein. The tank has a keyed slide there on. The saddle rack top is coupled slidably, via the key-way slot, to the keyed slide.

In a preferred, alternative embodiment, the saddle rack top comprises a pair of saddle racks each having the general curvature approximating the undercurve of a saddle. Ideally the combination comprises, as well, the conveyance for transporting livestock. The conveyance includes a tack compartment. The tank and saddle rack top are mounted in the compartment, the saddle rack with saddle on top being accessible from the exterior of the compartment.

DETAILS OF BEST MODE FOR CARRYING OUT THE INVENTION

Figure 1:
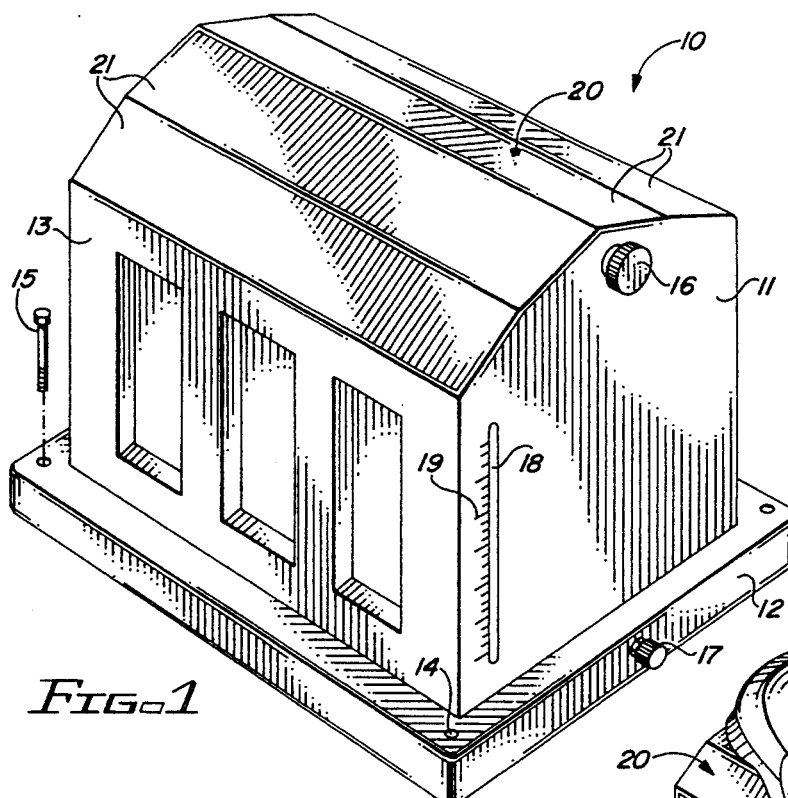
FIG. 1 shows an elevational perspective view of an embodiment of the present invention.

For purposes of promoting an understanding of the principles of the invention, reference will now be made to the embodiments illustrated in the drawings and specific language will be used to describe same. It will nevertheless be understood that no limitation of the scope of the invention is thereby intended. Alterations and modifications of the illustrated device are contemplated, as are such further applications of the principles of the invention as would normally occur to one skilled in the art to which the invention pertains.

Device 10 comprises fluid tank 11 which is constructed with integral base 12. Device 10 may be constructed using any appropriate material, most desirably a light-weight polymer formed by traditional injection molding, to produce fluid tank 11 and base 12 as one piece. Incorporating ribbed side panels 13 into fluid tank 11 provides additional strength to prevent buckling of side panels 13 when fluid pressure from inside tank 11 is exerted. Hardware mounting holes 14 are provided in base 12 so that device 10 may be securely fastened to a flat surface with screw fastening hardware 15.

Input port 16 may be coupled to a standard garden hose to fill tank 11 with a drinking fluid—for example, water—then be secured with a cap. Fluid is dispensed from tank 11 through output port 17 which may be coupled to a standard garden hose to easily fill buckets or other containers with drinking fluid for direct provision to horses. Output port 17, too, is secured with a cap. Transparent view tube 18 is provided in a vertical orientation within a side of tank 11 for direct viewing of the fluid level within. View tube 18 is also provided with indicia 19 to indicate fluid content in gallons or liters.

Figure 2:
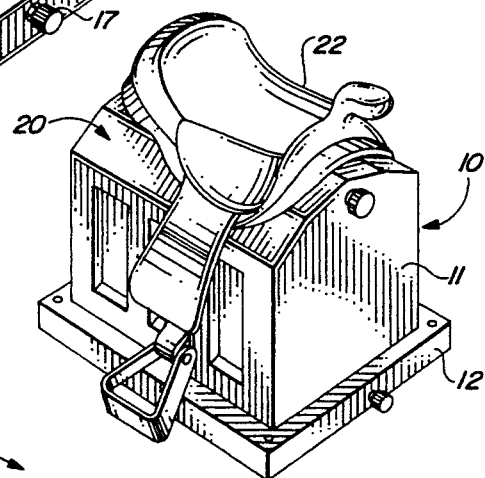
FIG. 2 shows an elevational perspective view of an embodiment of the present invention, with a saddle in place on the saddle rack top.

Device 10 further comprises curved top 20, formed with at least four inclined panels 21 substantially as shown in FIG. 1. Inclined panels 21 are configured so as to provide a shape which conforms to the undercurvature of saddle 22 (FIG. 2) for secure saddle storage. Panels 21 provide added strength to curved top 20.

Figure 3:
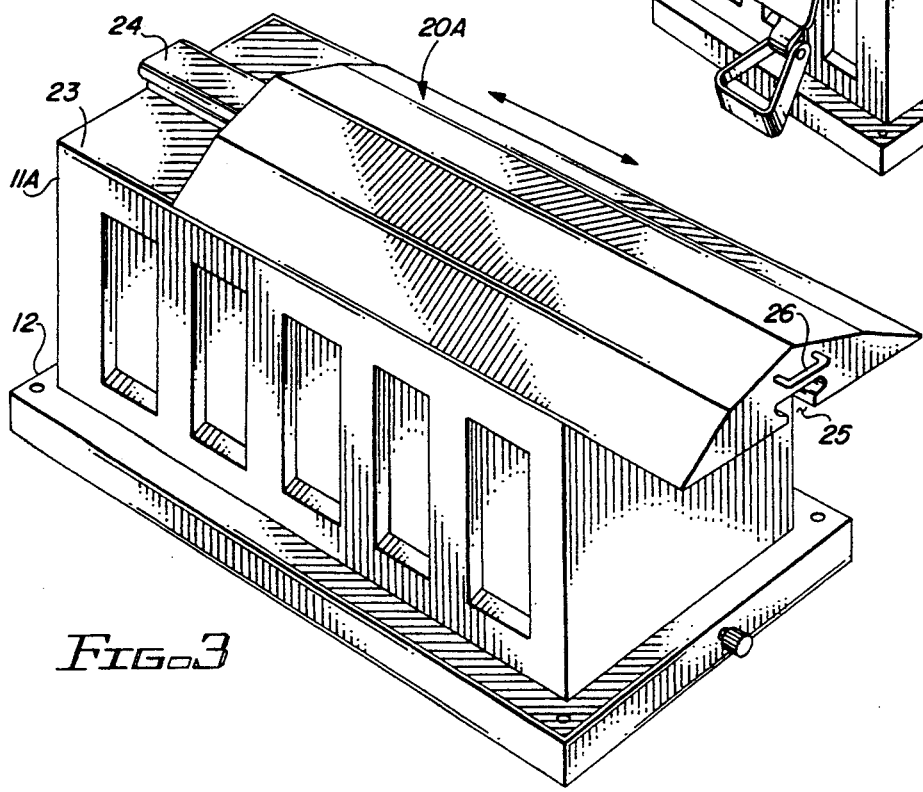
FIG. 3 shows an elevational perspective view of an alternate embodiment of the present invention, wherein the saddle rack top is slidably displaceable with respect to the fluid tank.
Figure 4:
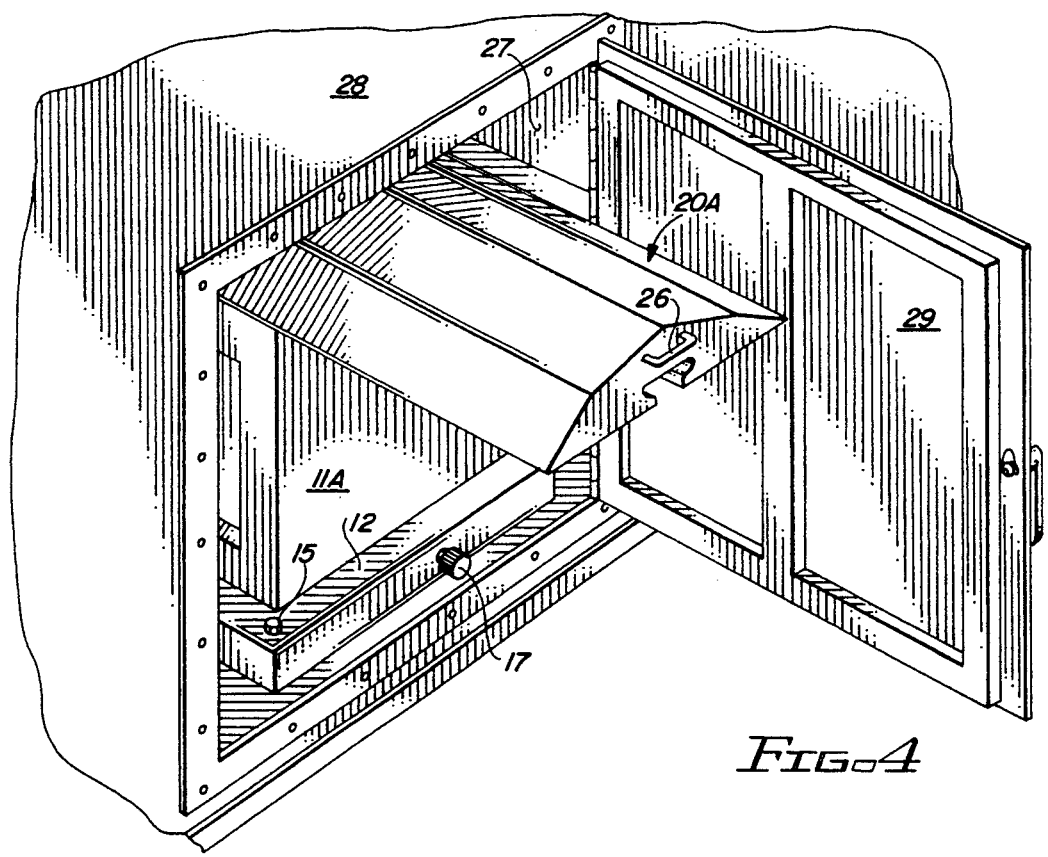
FIG. 4 shows the embodiment of FIG. 3 mounted within a tack compartment of a horse trailer, further showing the saddle rack in its outward position for loading or unloading of a saddle.

An alternate embodiment of device 10 is shown if FIG. 3 and contemplates two-piece construction of flat top fluid tank 11A and slidable curved top 20A. Tank 11A comprises flat top 23 and keyed slide 24. Slidable curved top 20A has the same top configuration as curved top 20 to provide for saddle storage, but additionally comprises key-way slot 25 which engages keyed slide 24 for adjustable positioning of slidable curved top 20A with respect to tank 11A. Slide movement of curved top 20A is accomplished with pull handle 26. This embodiment allows device 10 to be mounted in tack compartment 27 of horse trailer 28 (FIG. 4) so that saddle 22 can be easily and conveniently loaded onto and unloaded from curved top 20A. During storage and transportation, curved top 20A is slid back into tack compartment 27 and directly over tank 11A so that tack compartment door 29 may be secured shut.

Figure 5:
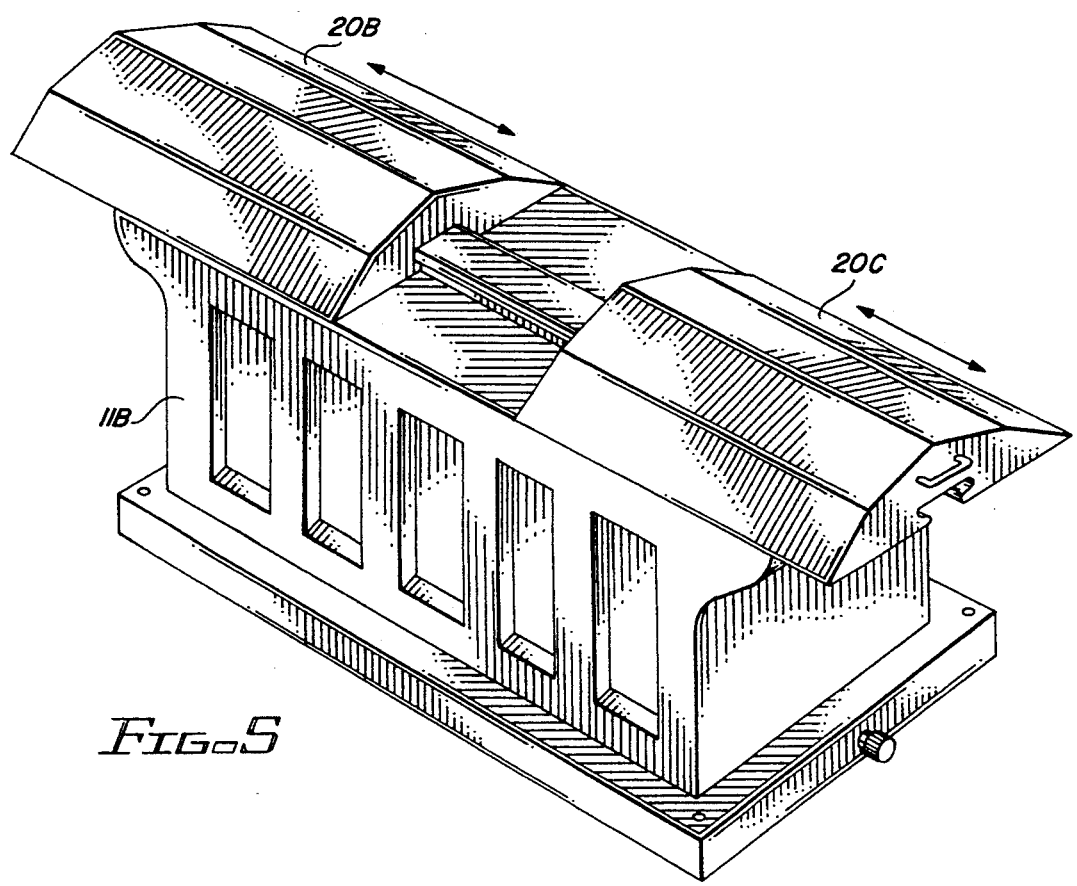
FIG. 5 is an elevational perspective view of an alternate embodiment having a pair of slidably displaceable saddle rack tops.

A presently preferred alternative embodiment (FIG. 5) is conceived for use with transport having a tack compartment running the full width of the vehicle or trailer. In this embodiment, tank 11B has a length L approximating the interior length of the tack compartment. Such full width tack compartments generally have two access doors, one on each side of the vehicle or trailer. The embodiment of FIG. 5 has a pair of slidable saddle racks 20B and 20C which may be accessed directly from one side or the other of the tack compartment. What has been described is a combination fluid tank and saddle rack that may be mounted to a flat surface or the bed of a horse trailer. The device is ideally of one-piece polymer construction, with fluid input and output ports. The top of the device is generally shaped to conform to the undercurvature of a saddle to provide for secure saddle storage during transportation. An alternative embodiment of the device provides for a saddle rack top, formed as a separate piece from the fluid tank and slidably mounted to the tank through a keyed slide and key-way slot mechanism. This embodiment allows for easy loading and unloading of a saddle to and from the rack when the device is mounted wholly within the tack compartment of a horse trailer. Alternatively, the slidable saddle rack may comprise a pair of such racks each independently slidable with respect to the other.

Those skilled in the art will conceive of other embodiments of the invention which may be drawn from the disclosure herein. To the extent that such other embodiments are so drawn, it is intended that they shall fall within the ambit of protection provided by the claims herein.

Having described the invention in the foregoing description and drawings in such clear and concise manner that those skilled in the art may readily understand and practice the invention, That which is claimed is:

1. The combination comprising:
   a liquid storage and transport tank; and
   a saddle rack top on said tank slidably coupled to said tank, said saddle rack top having a curvature generally approximating the undercurve of a saddle, said tank rack top being transportable on a conveyance for transport of livestock.

2. The combination of claim 1 wherein said general curvature comprises by at least four generally planar surfaces angularly offset, one with respect to the other, in approximation of said general undercurvature of a saddle.

3. The combination of claim 2 further comprising said conveyance for transporting livestock, said conveyance including a tack compartment, said tank and saddle rack top being mounted in said compartment, said saddle rack being accessible from the exterior of said compartment.

4. The combination of claim 1 wherein said liquid storage and transport tank is a one piece, polymer construction.

5. The combination of claim 1 wherein said saddle rack top comprises a pair of saddle racks each having said general curvature approximating said undercurve of a saddle.

6. The combination of claim 1 wherein said saddle rack top has a key-way slot therein and said tank has a keyed slide thereon, said saddle rack top being coupled slidably, via said key-way slot, to said keyed slide.

7. The combination of claim 6 further comprising a conveyance for transporting livestock, said conveyance including a tack compartment, said tank and saddle rack top being mounted in said compartment, said addle rack being accessible from the exterior of said compartment.

8. The combination of claim 1 wherein each of said tank and said saddle rack top comprises an integral unit fabricated from a polymeric material.

9. The combination of claim 5 wherein said general curvature comprises by at least four generally planar surfaces angularly offset, one with respect to to the other, in approximation of said general curvature of said undercurve of said saddle.

10. The combination of claim 9 further comprising said conveyance for transporting livestock, said conveyance including a tack compartment, said tank and saddle rack top being mounted in said compartment, said saddle rack being accessible from the exterior of said compartment.

11. The combination of claim 5 wherein said saddle rack top is slidably coupled to said tank.

12. The combination of claim 11 wherein said saddle rack top has a key-way slot therein and said tank has a keyed slide thereon, each said saddle rack top being coupled slidably, via said key-way slot, to said keyed slide.

13. The combination of claim 12 wherein each of said tank and said saddle rack top comprises a one piece, polymer unit.

14. The combination of claim 13 further comprising said conveyance for transporting livestock, said conveyance including a tack compartment, said tank and saddle rack top being mounted in said compartment, said saddle rack being accessible from the exterior of said compartment.

* * * * *